UNITED STATES PATENT OFFICE.

FRANCIS PEYRE PORCHER, OF CHARLESTON, SOUTH CAROLINA.

IMPROVEMENT IN THE PREPARATION OF MATERIALS FOR TANNING.

Specification forming part of Letters Patent No. 115,100, dated May 23, 1871; antedated May 17, 1871.

*To all whom it may concern:*

Be it known that I, FRANCIS PEYRE PORCHER, M. D., of the city and county of Charleston and State of South Carolina, have discovered and invented new and useful Materials to be used in the Tanning of Leather for Dyeing and for the Manufacture of Inks and other like purposes, which I do not believe to have been known or used in the arts before my discovery thereof.

This invention and discovery is in the nature of an additional improvement upon the subject-matter of my patent dated January 18, 1870, and numbered 98,884, and is intended to utilize the leaves of various trees, shrubs, and plants which have heretofore been deemed of no special value, and in some instances also the bark, stems, roots, and other portions of such trees, plants, and shrubs.

The following is a list of the articles which I have discovered to possess valuable properties in large proportions for the uses aforesaid, to wit:

The stems, roots, and leaves of low-bush dewberry or creeping blackberry, (Rubus trivialis: Mich.,) and of Juneberry or high-bush blackberry, (Rubus villosus: Aét.,) and other varieties of "blackberries."

The leaves of tetter-bush, (Andromeda nitida: Walter.)

The stems, roots, and leaves of marsh rosemary or ink-root, (Statice limonium: Torrey; Statice Caroliniana: Walter.)

The leaves of sweet swamp-bay or laurel, (Magnolia glauca: Linn.)

The leaves of sparcle or tarcleberry, (Vaccinium arboreum: Marsh.)

The stems and leaves of plantain, (Plantago major and Plantago lanceolata.)

The bark and leaves of dog-wood (Cornus Florida) and other species of cornus.

The stems, leaves, and root of ferns, (Osmunda regalis, Aspleneum eleneum and filix mas, Adiantum pedatum, Polypodium incanum,) and other species of ferns.

The stems, roots, and leaves of American alum-root, (Henchera Americana.)

The leaves, flowers, and bark of witch-hazel, (Hamamelis Virginica.)

The catkins and flowers of alder, (Alnus cerulata.)

The roots, stems, and leaves of dollar plant, (Rhyncosia tomentoso.)

The leaves of Chinese tallow-tree, (Styllingia sebifera.)

The root and leaves of alum-root, crane's-bill, (Geranium maculatum,) and of Carolina geranium, (G. Carolinianum.)

The fruit of unripe persimmons, (Diospyrus Virginiana.)

The fruit, bark, and seed-vessels of sweet-gum tree, (Liquidambar styraciflua.)

The leaves, stems, and flowers of yarrow, (Achillea millefolium: L.)

The infusion or extract prepared from excrescences, fruit, and leaves of cypress, (Cupressus disticha: L. and C. thyoides: L.)

The balls, excrescences, and leaves of the cedar, (Juniperus Virginiana.)

The leaves and flowers of agrimony or fever-few, (Agrimonia eupatoria: Linn.)

The leaves, stems, and flowers of May-weed or wild camomile, (Maruta cotula: D. C.)

This last, and the balls, excrescences, leaves, &c., of cypress and cedar mentioned in the two preceding paragraphs, are to be added to infusions of the other tanning ingredients in the preparation of "Russia" leather, and to prevent leather prepared by other agents from being attacked by moths or other insects, or be acted upon by mold.

In addition to the foregoing substances I have also ascertained that the stems and bark, but more particularly the leaves, of the sweet leaf (Hopia tinctoria) are exceedingly useful for tanning leather, and at the same time imparting to the whole substance of the leather a bright permanent yellow color. It is more particularly desirable for the properties last mentioned, as the leather so dyed may be used for various ornamental work and for other purposes.

The method of preparing all the aforesaid articles as commercial commodities, and the manner in which they are to be used, are set forth substantially in my patent of January 18, 1870, above referred to, and need not now be restated.

What, therefore, I now desire to be understood as my invention or discovery is the use of the above-enumerated articles, to be applied to the tanning and preparation of leather, the dyeing of cloths and other articles, and the manufacture of ink, in the manner above described.

The articles above enumerated may be prepared for use by first drying the leaves and other products, grinding and packing them in bales or other convenient packages, so that they may be conveniently transported and treated as commercial commodities.

Their properties may likewise be extracted, and such extract may then be concentrated into a semi-solidified form in some of the methods described in my patent of January 18, 1870.

Whether put up in packages in their crude state, or whether their virtues are extracted and concentrated, as is hereinbefore respectively contemplated to be used in the tanning and preparation of leather and for other purposes, those ingredients which are intended for the preparation of Russia leather or to protect the leather after it is tanned from being attacked by moths and other insects and from mold, should be kept separate from the ingredients which are intended specially for tanning leather or dying cloths and other like uses, and should only be mixed with the other solutions or extracts when they are applied in the process of tanning.

What, therefore, I now claim as my invention or discovery, is—

1. The use of the articles above enumerated when applied to the objects hereinbefore described.

2. The new commodity, manufacture, or article of trade which is produced by grinding, drying, and packing the above-mentioned articles, for the purposes stated.

3. The use of vegetable extracts from the substances above enumerated by processes hereinbefore described or contemplated, and for the purposes therein intended.

4. The use of the fruit-excrescences and leaves of cypress or cedar trees, or that of the leaves, stems, and flowers of the May-weed or wild camomile, in the manner and for the purposes hereinbefore set forth and described.

FRANCIS PEYRE PORCHER, M. D.

Witnesses:
ISABELLA S. PORCHER,
JULIAN H. PORCHER.